United States Patent [19]

Carlson et al.

[11] Patent Number: 4,963,415

[45] Date of Patent: Oct. 16, 1990

[54] PROCESS FOR TEMPERATURE INDICATION OF A HEAT RECOVERABLE ARTICLE

[75] Inventors: James G. Carlson, Maplewood; Dean R. Yarian, Dellwood, both of Minn.

[73] Assignee: Minnesota Mining and Manufacturing Company, St. Paul, Minn.

[21] Appl. No.: 700,393

[22] Filed: Feb. 11, 1985

[51] Int. Cl.$^5$ .............................................. B32B 27/06
[52] U.S. Cl. .................................... 428/199; 428/208; 428/913
[58] Field of Search ................ 430/353, 169; 428/913, 428/204, 349, 518, 199, 208; 346/212

[56] References Cited

U.S. PATENT DOCUMENTS

| | | | |
|---|---|---|---|
| 2,772,158 | 11/1956 | Elliott | 430/353 |
| 2,789,052 | 4/1957 | Elliott | 430/353 X |
| 2,789,053 | 4/1957 | Elliott | 430/353 X |
| 2,905,554 | 9/1959 | Fuchsman et al. | 430/353 X |
| 3,097,297 | 7/1963 | Sahler | 430/353 X |
| 3,155,513 | 11/1964 | Sorensen | 430/169 |
| 4,105,583 | 8/1978 | Glover et al. | 428/913 X |
| 4,121,011 | 10/1978 | Glover et al. | 428/913 X |
| 4,344,909 | 8/1982 | De Blauwe | 428/913 X |

FOREIGN PATENT DOCUMENTS 0042285 12/1981 European Pat. Off. ........ 428/913 X

*Primary Examiner*—Thomas J. Herbert
*Attorney, Agent, or Firm*—Donald M. Sell; Walter N. Kirn; Robert H. Jordan

[57] ABSTRACT

A process for determining whether a heat recoverable article has achieved sufficient temperature comprising applying to the surface of the article to be heated a composition comprising a chlorinated polymer and a zinc salt and the resultant article.

16 Claims, No Drawings

PROCESS FOR TEMPERATURE INDICATION OF A HEAT RECOVERABLE ARTICLE

FIELD OF THE INVENTION

The invention relates to a process for determining whether a heat recoverable article has been heated to a sufficient temperature to achieve desired conditions, i.e., shrinkage, hot melt mastic flow, etc. More specifically, the process utilizes a zinc-based composition applied to the surface of the article.

BACKGROUND ART

Heat-recoverable or heat reactive articles are used in a variety of commercial areas, and are typically based on the concept that the article, upon the application of heat thereto, will shrink to a predetermined position One area where such articles have exemplary utility is in the repair of telecommunication cables. The heat-recoverable article can be applied to the proper cable location, followed by heating to cause shrinkage thereof around the cable to insure a tight fit without the availability of ingress of moisture. Additionally, there is typically present on the interior surface of such articles a meltable sealant or hot melt adhesive which melts and flows during the shrinking process to aid in the sealing of the article and the cable to degrative environments. Obviously, it is incumbent that the heat-recoverable article be heated sufficiently to cause proper shrinkage and sealant flow, yet not excessively heated so as to incur degradation of the typically polymeric recoverable material.

Accordingly, it is desirable to have included with the article a thermochromic material which will undergo a color change upon achievement of a predetermined temperature.

Thermochromic pigments based on inorganic compounds, typically transition metal compounds, were initially commercially available on some heat reactive articles in the trade. In U.S. Pat. Nos. 4,105,583 and 4,121,011, for example, there are disclosed improvements designed to slow the degradation of heat reactive substrates. However, such materials based on transition metal compounds have resulted in problems, such as degradation of the heat reactive plastic substrates upon thermal conversion thereof, possibly due to flame propagation; minimal visibility of the thermal conversion; moisture sensitivity of the compositions; a reversibility tendency, i.e., a tendency to revert back to the original form subsequent to thermal conversion; and poor pigment dispersibility in the paint composition.

Organic compounds which are taught to melt and decompose are disclosed as thermochromics for use with heat reactive articles, typically with binders which prevent the leaching out thereof, in U.S. Pat. No. 4,344,909; U.K. Patent Application No. 2,038,478A; and U.K. Patent Application No. 2,077,919A. Further, EPO Patent No. WO84/00608 discloses a two component organic system wherein a colorant and an activator are used in an ultraviolet cured binder system on heat reactive articles. By varying the amount of the activator, it is taught that the temperature of conversion can similarly be varied.

Thermochromics based on such organic pigments suffer many of the problems noted above, i.e., moisture sensitivity/water leachability of pigments and/or degradation products; difficult dispersibility of pigments; poor hiding power, because of the relatively low refractive index of such pigments. Furthermore, a true white-to-black conversion may not be attainable because the initial color of typical pigments is an off-white masked by a green or blue dye. In some cases the final converted color may be brown instead of black, thus not providing optimum visual indication of conversion.

It has been taught that polyvinyl chloride will interact with a number of metal salts to produce colored products in thermal processes. Thermal imaging utilizing polyvinyl chloride and zinc oxide together with sensitizing additives, such as silver salts, diazonium salts, acids, etc., has been disclosed in U.S. Pat. Nos. 2,772,158; 3,107,174; 3,155,513; 2,789,052; 2,789,053 and 2,772,159.

We have now discovered that a mixture of a chlorinated polymer and a zinc salt, when utilized in effect as a paintable or printable composition, will perform exceptionally well as a thermochromic indicator for heat recoverable articles.

Evidence has been provided in the literature that a colored organometallic complex will be formed when mixtures of polyvinyl chloride and zinc oxide are heated to their degradation point. Furthermore, it is also known that zinc oxide can function as an effective stabilizer for polyvinyl chloride at temperatures below this, acting as a scavenger for hydrogen chloride produced during thermal decomposition. We have found that the combination of these two effects produces a severely abrupt change from white to black when a mixture thereof is heated to its degradation temperature, thus providing ideal thermochromic indication for use with heat reactive articles.

Furthermore, we have found that when such mixtures are used as temperature indicators, optionally additionally containing a binder polymer, the drawbacks noted above relative to prior thermochromic materials have been overcome. For example, there is no moisture sensitive or water soluble element present therein. Unlike the prior art inorganic thermochromics, no reversion to white occurs upon standing after the color change has been initially attained. Where zinc oxide is used, it is a pure white, having a higher refractive index than prior art organic thermochromics, and can be commercially obtained in an optimum particle size for excellent dispersion and hiding power. Upon conversion, the composition converts to a very deep black so that maximum contrast is visually apparent. The temperature of conversion is ideal for many types of heat recoverable articles, and little or no heat reactive substrate degradation is observed upon thermal conversion of the composition.

DISCLOSURE OF THE INVENTION

In accordance with the invention, there is provided a process for determining whether an appropriate temperature of a heat recoverable article has been achieved, the process comprising the steps of applying a composition to the surface of the article to be heated, the composition comprising a chlorinated polymer and a zinc salt. The composition can be applied by various techniques, including, but not limited to, painting, spraying and printing, such as by gravure or silk screening techniques.

Furthermore, the invention also is directed to a heat recoverable article after having the foregoing process undertaken relative thereto.

DETAILED DESCRIPTION OF THE INVENTION

In general, the thermochromic system useful herein comprises the combination of a chlorine-containing polymer and a zinc salt.

Examples of chlorine-containing polymers include polyvinyl chloride; chlorinated polyvinyl chloride; vinyl chloride copolymers, such as vinyl chloride/vinyl acetate and vinyl chloride/vinylidene chloride; and vinylidene chloride; the preferred material being polyvinyl chloride.

Useful zinc salts are those capable of forming zinc chloride during the thermochromic process. Exemplary salts include zinc oxide, zinc hydroxide, zinc chloride, zinc nitrate, etc. Zinc oxide and zinc hydroxide are the preferred salts because they are opaque white in color.

The ratio of chlorinated polymer to zinc salt should be from between about 1 to 10 and about 20 to 1 by weight, with from about 2 to about 4 to one being preferred, and 3 to 1 being most preferred, especially with a paintable composition. For example, a combination of three parts of polyvinyl chloride with one part of zinc oxide will turn from white to deep black at a temperature of 250° C. in a matter of a few seconds.

Increasing amounts of zinc salt will in effect begin to mask the color change which occurs. Conversely, decreasing quantities of zinc salt may tend to reduce the optimum color change, i.e., the change may become reddish as opposed to black or dark.

In the preparation of a proper composition for use in the process, either or both the chlorinated polymer and zinc salt may be dissolved in an appropriate solvent, dispersed as a powder, or a combination thereof. In fact, it has been unexpectedly found that zinc oxide, a preferred zinc salt, does not have to be intimately dispersed within the preferred polyvinyl chloride polymer. A dry blend of powders of the two materials when mixed together produces a visible thermochromic change. Discovery of this concept allows the formulation of a highly opaque white paint of a sprayable viscosity. Because both components can be applied in a dispersed rather than a dissolved state, high solids loadings can be utilized without excessive development of viscosity.

In addition to the zinc salt and the chlorinated polymer, other components can be included as desired. For example, a binder can be utilized for binding the pigments together and providing toughness and durability to the composition, when applied to the heat recoverable substrate. In addition, a binder, typically a polymeric material capable of film formation when applied via a solvent to a substrate, is advantageous to provide adhesion of the necessary components to the substrate.

A binder can be utilized from about 5 to about 90 percent by weight of the total composition, with from about 10 to about 30 percent by weight being preferred.

Examples of materials capable of functioning as a binder herein include chlorosulfonated polyethylene, commercially available from DuPont under the name "Hypalon 30"; ethylene/acrylic copolymers, a commercial example of which is "Vamac" from DuPont; acrylic polymers, such as "Elvacite 2028", commercially available from DuPont; ethylene/vinyl acetate copolymers, an example of which is the "Elvax" family from DuPont; ethylene/vinyl acetate emulsions, an example of which is "Elvace", commercially available from DuPont; and styrene/maleic half-ester copolymers, an example of which is "SMA 1440A", commercially available from Arco Chemical.

In addition, additional pigments and dyes may be added to the composition as desired. For example, titanium dioxide can be added at a concentration of up to about 15 percent by weight to provide increased opacity to the composition; dyes such as crystal violet (CI 42555) can be added to impart initial color to the composition; and pigments such as "Bonadur Red", commercially available from the Sun Chemical Company, can similarly be added to impart initial color to the composition.

As contrasted to painting or spraying of the composition, same can also be applied by conventional printing techniques, e.g., silk screen and gravure. In this instance, conventional solvent systems and additives for such printing techniques can be utilized. For example, with gravure printing, a volume mixture of 60/40 xylene/diisobutyl ketone is effective. Similarly with a silk screen process a volume mixture of 75/25 "Penola 150", a commercially hydrocarbon solvent/carbitol acetate has been found effective, and a flow agent such as silicone solution can be added.

The invention will now be more specifically described by the following non-limiting examples, wherein all parts are by weight unless otherwise specified.

EXAMPLE 1

In a suitable mixing vessel were placed 24 grams of a polyvinyl chloride powder, "Geon 138", commercially available from B. F. Goodrich Chem., 8.0 grams of zinc oxide, and 4.0 grams of titanium dioxide, followed by high shear mixing in 100 milliliters of 1,1,1-trichloroethane. To this mixture were added 60 grams of a 10 percent by weight solution of "Hypalon 30" in trichloroethane, followed by 40 grams of a 20 percent by weight trichloroethane solution of "SMA 1440 A", tradename for an adhesion promoter, commercially available from Arco Chemical. An additional 75 grams of trichloroethane were then added to the mixture, providing same with a sprayable viscosity of approximately 50 cp.

The sprayable composition was placed in a conventional air-powered spray gun and applied in a spatter pattern to the outer surface of a heat-shrinkable article comprising a black heat reactive polyethylene tube of four inches in diameter, two feet long, and fifty mils in thickness, the tube being capable of recovering 3× (i.e., to approximately 1.3 inches in diameter) the article further containing a spiral of 20 mils in diameter of a conventional hot melt adhesive on its inner surface. Following application of the composition to the outer surface of the black tube, it was determined that the adhesion thereof was satisfactory.

The thus coated tube was placed over a two inch diameter polyethylene-jacketed cable and heated with a torch until the white composition was converted to black, in effect thus becoming nearly invisible against the black background of the tubing.

The sample was then cooled to room temperature and sectioned to illustrate that the hot melt had sufficiently melted to form a seal and a bond to the underlying cable jacket.

It was surprising that the thermochromic composition did not change to a brown color upon exposure to open flame, but rather retained the white color until the thermochromic conversion to black occurred. Furthermore, the heat reactive article, upon examination, was found not to be charred or pitted, as usually occurs when flammable thermochromics are utilized.

In similar fashion, the thermochromic composition was applied to a heat recoverable polyethylene split sleeve of the type generally described in U.K. Pat. No. 1,155,470. Upon heating as discussed above, the material was converted to a black color, and upon examination of the structure, an excellent bond was again formed as discussed above.

EXAMPLE 2

To a suitable mixing container were added 86 grams of "Geon 138", 29 grams dioctylphthalate (a plasticizer and dispersing agent for PVC), 29 grams of zinc oxide and 14 grams of oleic acid (a dispersant for zinc oxide), followed by subjecting the mixture to high shear mixing, thereby providing a thick paste as the resultant product. This paste was diluted with 145 grams of isopropanol to provide a dispersion exhibiting good stability.

The composition was again applied to a tubing and sleeve as discussed in Example 1, and similar tests were conducted with similar results obtained.

EXAMPLE 3

A water-based version of our thermochromic composition was prepared by placing in a suitable mixing vessel 40 parts of "Elvace 1961", tradename for an aqueous ethylene/vinyl acetate emulsion, commercially available from DuPont Chemical; 24 parts "Geon 138"; 8 parts zinc oxide powder; 4 parts of titanium dioxide and 100 parts of water. The ethylene/vinyl acetate emulsion was first diluted with the water, whereupon the polyvinyl chloride and zinc oxide powders were added with vigorous stirring, thus creating a composition which could be applied by spraying or painting. In addition, a printing process using the formulation can be undertaken. This formulation is subject to removal upon prolonged exposure thereof to water.

When the thermochromic composition was applied to the tubing and sleeves of Example 1, similar results relative to adhesion and bonding to the underlying cable jacket were obtained.

EXAMPLE 4

A printing formulation for gravure application was prepared by mixing 12 parts of "Hypalon 30", 88 parts of a 60/40 volume mixture of xylene and diisobutyl ketone, 30 parts of "Geon 138" and 15 parts of zinc oxide.

When applied to the substrate of Example 1 by conventional gravure printing and tested as per Example 1, acceptable results were obtained. Substitution of 5 parts of zinc oxide with titanium dioxide provided a more opaque print, and again acceptable test results were obtained.

EXAMPLE 5

The formulations of Example 4 were duplicated with the exception that a 75/25 volume mixture of "Penola 150" and carbitol acetate was utilized as the solvent and 3 parts of a silicone solution were added. These formulations were applied to the article of Example 1 and tested, with acceptable conversion results obtained.

What is claimed is:

1. A heat-recoverable article capable of shrinking under the influence of heat and containing on its surface to be heated a thermochromic composition capable of changing color when an appropriate temperature has been achieved, said composition comprising a chlorinated polymer and a zinc salt.

2. The article of claim 1 wherein said composition additionally contains an effective amount of a colorant for said composition.

3. The article of claim 1 wherein said composition additionally contains an effective amount of a solvent.

4. The article of claim 1 wherein said chlorinated polymer is polyvinyl chloride.

5. The article of claim 1 wherein the weight ratio of said chlorinated polymer to said zinc salt is from between about 1 to 10 and about 20 to 1.

6. The article of claim 5 wherein said ratio is from about 2 to 1 to about 4 to 1.

7. The article of claim 1 wherein said composition additionally contains an effective amount of a binder.

8. The article of claim 7 wherein said binder is present at from about 5 to about 95 percent by weight of said composition.

9. A process for determining whether an appropriate temperature of a heat recoverable article has been achieved comprising applying to the surface of said article to be heated a composition comprising a chlorinated polymer and a zinc salt.

10. The process of claim 9 wherein said chlorinated polymer is polyvinyl chloride.

11. The process of claim 9 wherein said composition additionally contains an effective amount of a colorant for said composition.

12. The process of claim 9 wherein said composition additionally contains an effective amount of a solvent.

13. The process of claim 9 wherein the weight ratio of chlorinated polymer to zinc salt is from between about 1 to 10 and about 20 to 1.

14. The process of claim 13 wherein said ratio is from about 2 to 1 to about 4 to 1.

15. The process of claim 9 wherein said composition additionally contains an effective amount of a binder.

16. The process of claim 5 wherein said binder is present at from about 5 to about 95 percent by weight of said composition.

* * * * *